Figure 1:
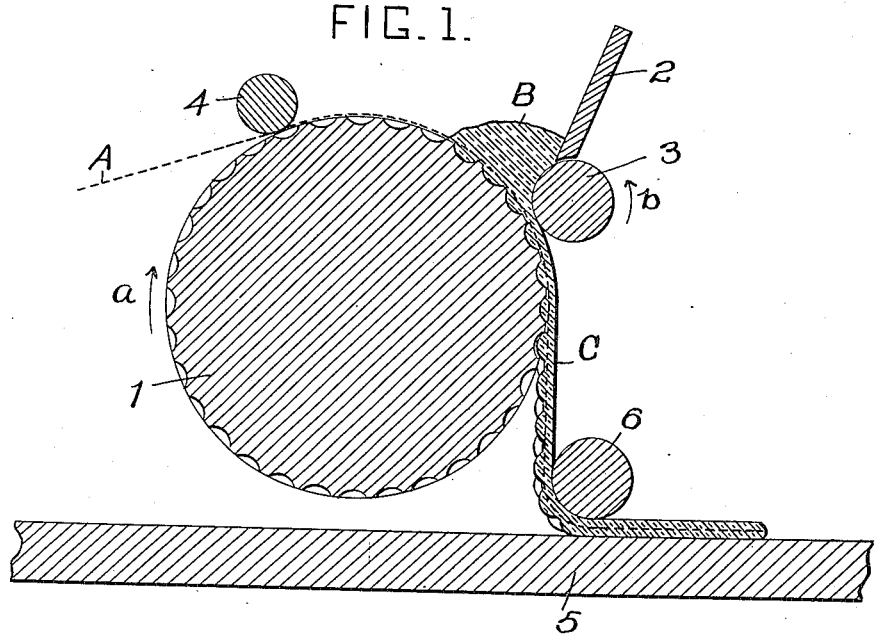

No. 839,575. PATENTED DEC. 25, 1906.
N. FRANZEN.
MACHINE FOR MAKING WIRE GLASS.
APPLICATION FILED AUG. 13, 1906.

WITNESSES:
J. Herbert Bradley.
Wm. H. Wilson.

INVENTOR
Nicklas Franzen
by Christy and Christy
Atty's.

UNITED STATES PATENT OFFICE.

NICKLAS FRANZEN, OF WALTON, PENNSYLVANIA, ASSIGNOR TO THE PITTSBURG PLATE GLASS COMPANY, OF PITTSBURG, PENNSYLVANIA, A CORPORATION OF PENNSYLVANIA.

MACHINE FOR MAKING WIRE-GLASS.

No. 839,575.     Specification of Letters Patent.     Patented Dec. 25, 1906.

Application filed August 13, 1906. Serial No. 330,451.

*To all whom it may concern:*

Be it known that I, NICKLAS FRANZEN, a citizen of the United States, residing at Walton, in the county of Allegheny and State of Pennsylvania, have invented or discovered certain new and useful Improvements in Machines for Making Wire-Glass, of which improvements the following is a specification.

My invention relates to improvements in machines for making wire-glass; and the objects of my improvement are simplicity of structure, economy in operation, and superiority in quality of product.

My present invention involves the use of a pitted roll, such as is described and claimed in Letters Patent No. 823,112, granted me June 12, 1906—that is, a roll in the surface of which are formed pits or pockets or culs-de-sac wherein small quantities of air are entrapped by the molten glass, the entrapped air forming an insulation and preventing chilling contact between the glass and the surface of the roll. A sheet spread by or on such a roll will have a surface rendered uneven by excrescences or protuberances of unchilled glass. These protrusions may be subsequently reduced and a well finished or polished surface produced.

My improvement involves the laying down or spreading upon the surface of such a pitted roll the wire which is to be embedded in the finished sheet, teeming the molten glass upon such a wire-covered surface of such a roll, and spreading the glass so teemed to sheet form upon the pitted roll, thus embedding the wire in the sheet as it is spread. The sheet may be removed from the surface of the pitted roll and its excrescences of unchilled glass reduced to a plane.

A machine embodying my improvement is illustrated in the accompanying drawings, which form part of this specification.

The two figures show the machine diagrammatically in transverse vertical section. A structural detail is shown in alternative form, as will presently be described.

The pitted roll 1 is arranged, preferably, in horizontal position to rotate, as indicated by the arrow $a$. A chute 2, arranged above and at one side of roll 1, forms, together with the upper surface of roll 1, a hopper-like receptacle wherein a batch of molten glass may be teemed and carried. A roll 3, arranged in the throat of this hopper-like receptacle, itself forming part of said receptacle, coöperates with said pitted roll to spread thereon to sheet form the molten glass teemed into said hopper-like receptacle. A third roll 4 is arranged on the opposite side of the pitted roll from the chute, and this roll coöperates with the surface of said pitted roll and with roll 3 to spread the wire upon the upper surface of the rotating pitted roll.

Figure 2:
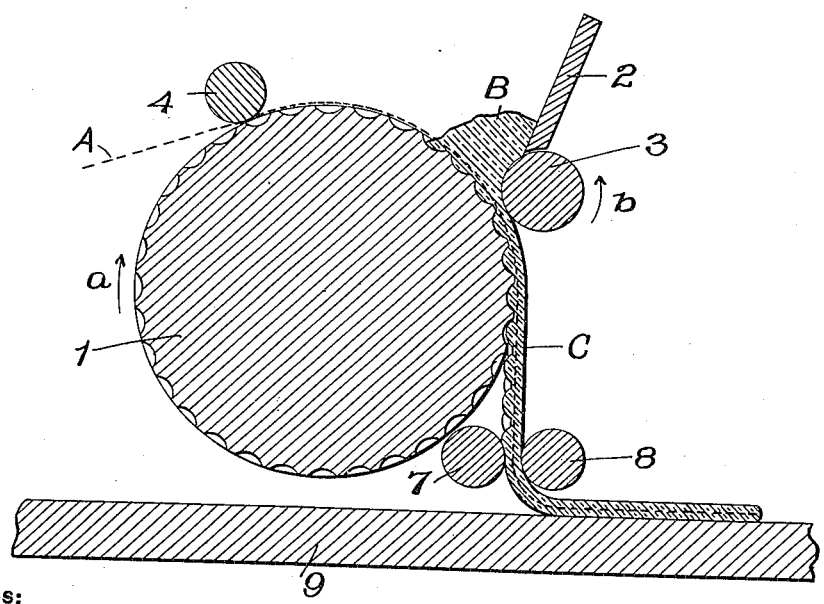

The operation of the parts thus far described will readily be understood. The wire A is carried between rolls 1 and 4, over the upper surface of the pitted roll, and into the pass between rolls 1 and 3. A batch of molten glass B is then teemed between chute 2 and the pitted roll. This molten glass passes freely through the meshes of the wire and enters and partly fills the culs-de-sac of the pitted roll, entrapping the insulating-air, as already described. Roll 1 is then rotated in the direction indicated by arrow $a$, and roll 3 is rotated (preferably positively rotated) in the direction indicated by arrow $b$, and the glass is thus spread into the wire-containing sheet C. This sheet of wire-glass C has a surface such as has already been described—a surface rendered uneven by protrusions of unchilled glass. The means employed for reducing this surface to a plane and finished condition are shown in alternative form in the drawings. In Fig. 1 a table 5 travels beneath roll 1 and receives sheet C as it is formed. Coöperating with table 5 is a roll 6, beneath which the sheet C is compressed and its surface brought to a plane. In Fig. 2 I have shown a pair of rolls 7 and 8, arranged to receive sheet C into the pass between them and operating to compress and reduce the surface of the sheet. The sheet may in such case be received on a traveling table 9.

In this specification and in the claims I have used the term "wire." I mean to include in that term not only the wire fabric or netting now commonly used in the manufacture of wire-glass, but any other material also of suitable character and form which may be found desirable for incorporating in sheets of plate-glass.

I claim as my invention—

1. In a machine for making wire-glass, the combination of a horizontally-arranged rotating pitted roll, a chute arranged adjacent to said pitted roll and forming therewith a hopper-like receptacle wherein molten glass may be teemed and carried, means for holding wire in contact with the pitted roll, such holding means permitting the feeding forward of the wire as the pitted roll rotates, and a spreading-roll closing the throat of said hopper-like receptacle and coöperating with said pitted roll to spread molten glass to sheet form thereon, embedding in such sheet as it is formed the wire carried by said pitted roll, substantially as described.

2. In a machine for making wire-glass, the combination of a horizontally-arranged rotating pitted roll, a chute arranged adjacent to said pitted roll and forming with the upper surface thereof a hopper-like receptacle wherein molten glass may be teemed and carried, two rolls arranged upon either side of said pitted roll and coöperating therewith to spread upon the upper surface of said pitted roll the wire to be incorporated in the finished sheet, one of said last-named rolls coöperating with said rotating pitted roll to spread to sheet form molten glass teemed into the aforesaid hopper-like receptacle, means for progressively receiving the sheet spread as aforesaid and for reducing to a plane the excrescences of unchilled glass formed upon the surface of said sheet by the pits in said pitted roll, substantially as described.

3. In a machine for making wire-glass, the combination of a horizontally-arranged rotating pitted roll, a chute arranged adjacent to said pitted roll, above and at one side thereof, and forming therewith a hopper-like receptacle wherein molten glass may be teemed and carried, a roll closing the throat of said hopper-like receptacle and coöperating with said pitted roll to spread thereon to sheet form the molten glass teemed into said hopper-like receptacle, a third roll arranged on the opposite side of said pitted roll from said hopper-like receptacle, and coöperating with said pitted roll and with said second-named roll to progressively spread the wire upon the upper surface of said pitted roll as the latter rotates, and means for receiving the sheet spread upon the pitted roll as aforesaid and for reducing to a plane the excrescences of unchilled glass formed upon the surface of said sheet by the pits in said pitted roll, substantially as described.

4. In a machine for making wire-glass, the combination of a horizontally-arranged rotating pitted roll, a chute arranged adjacent to said pitted roll, above and at one side thereof, and forming therewith a hopper-like receptacle wherein molten glass may be teemed and carried, a roll closing the throat of said hopper-like receptacle and coöperating with said pitted roll to spread thereon to sheet form the molten glass teemed into said hopper-like receptacle, and a third roll arranged on the opposite side of said pitted roll from said hopper-like receptacle, and coöperating with said pitted roll and with said second-named roll to progressively spread the wire upon the upper surface of said pitted roll, as the latter rotates, substantially as described.

5. In a machine for making wire-glass, the combination of a rotating pitted roll, a spreading-roll arranged in such relation to said pitted roll as to form therewith a hopper-like receptacle for molten glass, and coöperating with said pitted roll to spread to sheet form thereon molten glass so received, and a third roll coöperating with said pitted roll and said spreading-roll to progressively spread wire upon the surface of said pitted roll as said pitted roll rotates, substantially as described.

In testimony whereof I have hereunto set my hand.

NICKLAS FRANZEN.

Witnesses:
BAYARD H. CHRISTY,
FRIEDA E. WOLFF.